US006232380B1

(12) United States Patent
Conroy et al.

(10) Patent No.: US 6,232,380 B1
(45) Date of Patent: May 15, 2001

(54) LATENT MERCAPTAN STABILIZERS FOR IMPROVED WEATHERABILITY OF CLEAR HALOGEN-CONTAINING POLYMER COMPOSITIONS

(75) Inventors: Gary M. Conroy, Cincinnati; Gene K. Norris; Tod C. Duvall, both of Westchester, all of OH (US)

(73) Assignee: Morton International Inc., Chicago, IL (US)

( * ) Notice: Subject to any disclaimer, the term of this patent is extended or adjusted under 35 U.S.C. 154(b) by 0 days.

(21) Appl. No.: 09/200,145

(22) Filed: Nov. 25, 1998

Related U.S. Application Data

(63) Continuation-in-part of application No. 09/133,605, filed on Aug. 13, 1998, now abandoned, which is a continuation-in-part of application No. 09/048,492, filed on Mar. 26, 1998, which is a continuation-in-part of application No. 08/890,613, filed on Jul. 9, 1997, now abandoned, which is a continuation-in-part of application No. 08/597,093, filed on Feb. 23, 1996, now abandoned, which is a continuation-in-part of application No. 08/435,413, filed on May 10, 1995, now abandoned.

(51) Int. Cl.$^7$ .............................. C08K 5/12; C09K 15/10; C09K 3/00
(52) U.S. Cl. ...................... 524/291; 524/352; 252/393; 252/395; 252/404; 252/406
(58) Field of Search ...................... 524/291, 392; 252/393, 395, 404, 406

(56) References Cited

U.S. PATENT DOCUMENTS

| | | | |
|---|---|---|---|
| 2,824,079 | 2/1958 | Fischer | 260/31.8 |
| 3,498,947 | 3/1970 | Seki et al. | 260/45.75 |
| 3,505,383 | 4/1970 | Seki et al. | 260/45.75 |
| 3,600,416 | 8/1971 | Seki et al. | 260/429.7 |
| 4,062,881 | 12/1977 | Kugele | 260/399 |
| 4,179,432 | 12/1979 | Molt | 260/45.75 |
| 4,681,907 | 7/1987 | Mesch et al. | 524/180 |
| 5,030,676 | 7/1991 | Wallen | 524/182 |

FOREIGN PATENT DOCUMENTS 1001344  2/1962  (GB) .

*Primary Examiner*—Peter D. Mulcahy
(74) *Attorney, Agent, or Firm*—Robert M. Didrick

(57) ABSTRACT

Stabilizer compositions useful for protecting clear polyvinyl chloride and other clear halogen-containing polymer compositions used in the manufacture of exterior weatherable products against discoloration and degradation caused by exposure to ultraviolet light and weathering in addition to heat comprising a latent mercaptan which degrades during processing of the composition at an elevated temperature to liberate a free mercaptan, in combination with a synergistic amount of a free phenyl salicylate compound. The latent mercaptan may be the sole heat stabilizer additive in the stabilizer composition, but the free mercaptan released during processing may also synergize the activity of organic-based or metal-based heat stabilizers such as metal salts and organometallic stabilizers such as organotin carboxylates and organotin mercaptides in the polymer composition.

Clear polyvinyl chloride and other clear halogen-containing polymer compositions containing these compounds are also provided which exhibit improved ultraviolet light stability and weatherability without detracting from their thermal performance.

15 Claims, No Drawings

LATENT MERCAPTAN STABILIZERS FOR IMPROVED WEATHERABILITY OF CLEAR HALOGEN-CONTAINING POLYMER COMPOSITIONS

This application is a C-I-P of 09/133,605 filed Aug. 13, 1998 abandoned; which is a C-I-P of 09/048,492 filed Mar. 26, 1998 pending, which is a C-I-P of 08/890,613 filed Jul. 9, 1997 abandoned; which is a C-I-P of 08/597,093 filed Feb. 23, 1996 abandoned; which is a C-I-P of 08/435,413 filed May 10, 1995 abandoned.

FIELD OF THE INVENTION

This invention relates to stabilizer compositions that are capable of stabilizing clear halogen-containing polymer compositions against the deteriorative effects of heat, light, and weathering. Such stabilizer compositions comprise a latent mercaptan, which during processing at elevated temperatures develop into corresponding degradation products, said products including a free mercaptan, in combination with very low levels of a free phenyl salicylate compound. This invention also relates to clear halogen-containing polymer compositions normally susceptible to both heat- and ultraviolet light-induced deterioration which comprises a halogen-containing polymer, the degradation products of a latent mercaptan present during processing of the polymer composition at an elevated temperature, said products including a free mercaptan, and a free phenyl salicylate compound. It also relates to such stabilizer and polymer compositions which further contain very low levels of a metal-based stabilizer, a Lewis Acid, an organic-based stabilizer, a hydrotalcite-based stabilizer, or other stabilizer synergists.

BACKGROUND OF THE INVENTION

It is well known that the physical properties of various organic polymers deteriorate and color changes take place during processing of the polymer and during exposure of formed polymer products to certain environments. The prime examples of polymers which are susceptible to degradation during processing are the halogen-containing polymers such as the vinyl and vinylidene polymers in which the halogen is attached directly to carbon atoms. Poly (vinyl chloride) or PVC, copolymers of vinyl chloride and vinyl acetate, and poly (vinylidene chloride), the principal resin in self-clinging transparent food wraps, are the most familiar polymers which require stabilization for their survival during fabrication into pipes, window casings, siding, bottles, wall covering, packaging film, and the like. When such polymers are processed at elevated temperatures, undesirable color changes often occur within the first 5 to 10 minutes as well as during later stages of the processing. Haziness, which sometimes accompanies the color changes, is particularly undesirable where clear products are needed.

The addition of heat stabilizers to such polymers has been absolutely essential to the wide-spread utility of the polymers. From a great deal of work in the development of more and more effective heat stabilizers there has emerged two principal classes: organotin compounds and mixed metal combinations. Organotin-based heat stabilizers are the most efficient and widely used stabilizers for rigid PVC. Synergistic combinations of alkyltin mercaptides and free mercaptans are particularly efficient heat stabilizers for rigid PVC during extrusion. They have not been entirely satisfactory, however, because of several failings on the part of the mercaptan synergist and are not used in flexible PVC.

Many mercaptans give off an offensive odor even at room temperature and the odor grows worse at PVC processing temperatures. The oxidative stability of the mercaptans is very often very poor. Oxidation of the free mercaptans diminishes the synergism. Thus, a combination having an enhanced synergism would be welcomed by the PVC industry. Also, because of the end-use of articles made from some polymers, many polymeric compositions require the presence of both biocides and heat stabilizers but the use of the organotin mercaptide/mercaptan combination in such a composition is often frustrated by the tendency of the free mercaptan to deactivate a biocide such as the much used OBPA (10, 10'-oxybisphenoxarsine).

Another shortcoming of such mercaptan-containing heat stabilizers is that they fail to protect the polymer compositions against the degrading effects of ultraviolet light and weathering. Upon prolonged exposure to ambient light and outdoor weathering conditions, products formed from these so-stabilized polymers readily tend to discolor and decompose with attendant loss in physical properties, e.g., tensile strength, flexibility, and impact resistance, which shortens the useful life of such articles.

With increased use of halogen-containing polymer compositions to form products designed for exterior weatherable applications, for example, vinyl house siding, window frames, window profiles, corrugated roofing, door stripping, etc., it is increasingly important to develop a stabilizer that will not only protect the polymers against heat encountered during processing and fabrication, but also protect the polymers against the long term effects of ambient light and outdoor weathering. Such a stabilizer is particularly desired for clear products which have very poor light stability and weatherability, as they generally do not contain opaque fillers and pigments, such as titanium dioxide, which inhibit light from penetrating therein and thus reduce the rate of polymer degradation.

In U.S. Pat. No. 3,660,331, Ludwig teaches the stabilization of vinyl halide resins by certain thioethers and thioesters of tetrahydropyran. Better heat stabilizer compositions are still needed, however. Heat stabilizers that offer improved ultraviolet light stability and weatherablity to halogen-containing polymer compositions, particularly clear polymers, are even further needed. The thioethers/low level phenyl salicylate stabilizer combinations of this invention satisfy such needs.

SUMMARY OF THE INVENTION

It is, therefore, an object of this invention to provide a heat stabilizer composition having the synergy of a mercaptan plus improved ultraviolet light stability and weatherability.

It is another object of this invention to provide a heat stabilizer composition having the synergy of a mercaptan plus improved oxidative stability.

It is yet another object of this invention to provide a heat stabilizer composition which is substantially free from the offensive odor typically associated with mercaptans.

It is a further object of this invention to provide a heat stabilizer composition having the synergy of a mercaptan plus improved biocide compatibility.

It is still another object of this invention to provide a heat stabilizer composition which comprises a latent-mercaptan containing heat stabilizer, in combination with a synergistic amount of a free phenyl salicylate compound.

It is a related object of this invention to provide a clear halogen-containing polymer composition and substantially transparent articles formed therefrom stabilized against heat, light and weathering by incorporation therein of a latent mercaptan-containing heat stabilizer, in combination with a synergistic amount of a free phenyl salicylate compound.

These and other objects of the invention which will become apparent from the following description are achieved by a stabilizer composition capable of stabilizing clear halogen-containing polymer compositions against the deteriorative effects of heat, light, and weathering, comprising the combination of a blocked mercaptan which degrades during processing of the composition at an elevated temperature to liberate a free mercaptan, and a synergistic amount of a relatively inexpensive free phenyl salicylate compound which is believed to undergo photo-fries rearrangement during prolonged exposure of the composition to ambient light to liberate a benzophenone compound which possesses relatively higher ultraviolet light-absorbing activity.

The aforesaid and other objects of the invention are also achieved by incorporating into a clear polymeric composition containing a halogen-containing polymer normally susceptible to heat- and ultraviolet light-induced deterioration, a blocked mercaptan, and a synergistic amount of a free phenyl salicylate compound and processing the composition at an elevated temperature at which the latent mercaptan degrades to liberate a free mercaptan. The terms "latent mercaptan" and "blocked mercaptan" are used interchangeably herein. The latent mercaptan may act as the sole heat stabilizer but may also be used with synergistic amounts of other heat stabilizers, such as very low levels of organic-based heat stabilizer, metal-based heat stabilizer or Lewis Acids and the like.

Other products of the degradation of the blocked mercaptan are believed to include carbocations of the blocking moiety which are stabilized by a molecular structure in which the electron deficiency is shared by several groups. Resonance stabilization and neighboring group stabilization are two of the possible mechanisms by which the carbocations may be stabilized. The carbocations act as intermediates in the formation of stable compounds early in the hot processing of halogen-containing polymers. Although such mechanisms and the resultant carbocations are believed to be an impetus for the liberation of the active free mercaptan, this invention is in no way limited by the foregoing attempt to explain the working of the invention. Those skilled in the art will see the resonance stabilization and neighboring group stabilization that are possible in the following structures of the blocked mercaptan; other mechanisms may be at work in other blocked mercaptans represented by these structures that also liberate an active free mercaptan upon thermal and/or chemical degradation during processing of polymeric compositions containing such blocked mercaptans.

Furthermore, photo-fries rearrangement of a substantial portion of the phenyl salicylate to its corresponding benzophenone structure during prolonged exposure to ambient light is one possible mechanism by which the very high ultraviolet light-absorbing activity of such stabilizer compositions is obtained. Although such mechanism and the resultant product are believed to be an impetus for the generation of highly active UV-absorbing compounds, those skilled in the art will understand that other mechanisms may be at work for improving the ultraviolet light stability and weatherability afforded by such compositions. This invention is thus in no way limited by the foregoing attempt to explain the working of the invention.

DETAILED DESCRIPTION OF THE INVENTION

The polymeric compositions of this invention contain polymers normally susceptible to heat-induced and light-induced deterioration through auto oxidation such as the above-noted halogen-containing polymers. The term "halogen-containing polymers" as used herein means halogen-containing polymers or resins in which the halogen is attached directly to the carbon atoms. Of particular interest to this invention are clear halogen-containing polymer compositions, especially the commercially important clear polyvinyl chloride compositions. The term "clear" as used herein means that the halogen-containing polymer compositions will result in articles which are essentially transparent. As will be appreciated by those skilled in the art, such compositions are substantially free of opaque pigments and fillers.

The stabilizer compositions of this invention are particularly suited to impart superior stabilization against the deteriorative effects of heat, ultraviolet light, and weathering in comparison with stabilizer compositions previously known in the art.

It has been quite unexpectedly discovered that clear halogen-containing polymer compositions which are designed for exterior weatherable applications, in particular, can be effectively stabilized against the degrading effects of light and weathering in addition to heat by incorporating therein a stabilizingly effective amount of a stabilizer composition comprising A) at least one latent mercaptan stabilizer and B) at least one free phenyl salicylate compound; whereas in corresponding opaquely pigmented or filled halogen-containing polymer compositions so-stabilized, no benefit in terms of ultraviolet light stability and weatherability is observed.

The halogen-containing organic polymers which can be stabilized according to this invention include chlorinated polyethylene having 14 to 75%, e.g. 27%, chlorine by weight, chlorinated natural and synthetic rubber, rubber hydrochloride, chlorinated polystyrene, chlorinated polyvinyl chloride, polyvinyl bromide, polyvinyl fluoride, copolymers of vinyl chloride with 1 to 90%, preferably 1 to 30%, of a copolymerizable ethylenically unsaturated material such as, for example, vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate and other alkyl methacrylates, methyl alpha-chloroacrylate, styrene, trichloroethylene, vinyl ethers such as vinyl ethyl ether, vinyl chloroethyl ether and vinyl phenyl ether, vinyl ketones such as vinyl methyl ketone and vinyl phenyl ketone, 1-fluoro-2-chloroethylene, acrylonitrile, chloroacrylonitrile, allylidene diacetate and chloroallylidene diacetate. Typical copolymers include vinyl chloride-vinyl acetate (96:4 sold commercially as VYNW), vinyl chloride-vinyl acetate (87:13), vinyl chloride-vinyl acetate-maleic anhydride ((86:13:1), vinyl chloride-vinylidene chloride (95:5); vinyl chloride-diethyl fumarate (95:5), and vinyl chloride 2-ethylhexyl acrylate (80:20).

Preferably, the halogen-containing organic polymer is a vinyl halide polymer, more particularly vinyl chloride polymer. Usually, the vinyl chloride polymer is made from monomers consisting of vinyl chloride alone or a mixture of monomers comprising, preferably, at least about 70% by weight based on the total monomer weight of vinyl chloride. As used herein, the term polyvinyl chloride or PVC composition means a composition comprising a vinyl halide polymer. A rigid PVC composition is one which does not contain a plasticizer. A semi-rigid PVC composition is one which contains from 1 to about 25 parts of a plasticizer per 100 parts by weight of the halogen-containing vinyl polymer. A flexible PVC composition contains from about 25 to about 100 parts per 100 parts by weight of the halogen-containing vinyl polymer. Alkyl esters of carboxylic acids in which there are from 1 to 3 alkyl groups having from 8 to 12 carbon atoms are representative of the plasticizers. The alkyl group may be n-octyl, 2-ethylhexyl, nonyl, decyl, or dodecyl. Suitable esters include phthalates, trimellitates, benzoates, adipates, glutarates, and sebacates. The plasticizer may also be a pentaerythritol or such an ester thereof. A polymeric plasticizer is also suitable. The stabilizer compositions of this invention are effective in flexible as well as rigid and semi-rigid PVC compositions.

In the stabilizer compositions of this invention, the amount of latent mercaptan and free phenyl salicylate employed will depend upon several factors, including, but not limited to, the particular compounds employed, the particular resin to be stabilized, the severity of heat, light and weathering to which the resin will be subjected and the degree of stabilization desired. Thus, the amount of each component may vary widely, it being required only that the stabilizer composition contain enough of each component to stabilize a halogenated polymer against the deteriorative effects of heat, light and weathering, and that the free phenyl salicylate be present in an amount which will synergize such stabilization. The stabilizer compositions of this invention generally contain A) from about 50 wt % to about 98.8 wt %, preferably from about 80 wt % to about 96 wt %, based on the combined weight of A) plus B) of a latent mercaptan or mixture of latent mercaptans, and B) from about 1.2 wt % to about 50 wt. %, preferably about 4 wt % to about 20 wt %, based on the combined weight of A) plus B) of a free phenyl salicylate compound or mixture of phenyl salicylate compounds. Other compounds which may be included in the stabilizer compositions are calculated by weight, based on the weight of the weight of the halogen-containing polymer.

The blocked mercaptans suitable for the purposes of this invention are represented by FORMULA 1:

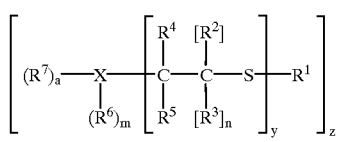

FORMULA 1 wherein a is 0 or 1, m and n are 0 or 1; y=1 to 4; when y=1, z is 1 to 4; and when y is more than 1, z is 1; R1 is an alkyl, alkylenyl, cycloalkyl, cycloalkylenyl, aryl, alkaryl, aralkyl, aralkylenyl, hydroxyalkyl, dihydroxyalkyl, hydroxy (polyalkoxy) alkyl, alkoxyalkyl, hydroxyalkoxyalkyl, alkoxy (hydroxyalkyl ), alkoxy (acyloxyalkyl), alkoxy (polyalkoxy) alkyl, alkoxy(polyalkoxy) carbonylalkyl, carboxyalkyl, acyloxyalkyl, acyloxy(hydroxyalkyl), acyloxyalkoxyalkyl, acyloxy(polyalkoxy)alkyl, benzoyloxy (polyalkoxy)alkyl, alkylenebis-(acyloxyalkyl), alkoxycarbonylalkyl, alkoxycarbonylalkylenyl, hydroxyalkoxycarbonylalkyl, hydroxy (polyalkoxy) carbonylalkyl, mercaptoalkyl, mercaptoalkylenyl, mercaptoalkoxycarbonylalkyl, mercaptoalkoxycarbonylalkylenyl, alkoxycarbonyl (amido) alkyl, alkylcarbonyloxy(polyalkoxy)carbonylalkyl, tetrahydopyranyloxy (polyalkoxy) carbonylalkyl, tetrahydropyranyloxyalkyl, hydroxyaryl, mercaptoaryl or carboxyaryl radical having from 1 to 22 carbon atoms; $R^2$, $R^3$, $R^4$, $R^5$, $R^6$, and $R^7$ are independently hydrogen, a hydroxyl, mercapto, acyl, alkyl, alkylenyl, aryl, haloaryl, alkaryl, aralkyl, hydroxyalkyl, mercaptoalkyl, hydroxyaryl, alkoxyaryl, alkoxyhydroxyaryl, mercaptoaryl groups having from 1 to 22 carbon atoms; X is aryl, haloaryl, alkaryl, hydroxyaryl, dihydroxyaryl, alkoxyaryl, arylcycloalkyl, or a heteroatom, with the option that when a is 1 and m is 1, $R^6$ and $R^7$ form a heterocyclic moiety in conjunction with X as nitrogen, and with the further option that when a=1 and m=0, one of $R^1$, $R^3$, and $R^5$ joins with $R^7$ and X to form a heterocyclic moiety with X as a heteroatom selected from the group consisting of oxygen and sulfur; with the proviso that z is 1 or 2 when X is aralkaryl, $R^6$ and $R^7$ are hydroxyl, a is 1 and m is 1, and with the further proviso that when $R^6$; hydroxyl or mercapto, z is 1.

The mercaptans which may be converted into latent mercaptans for the purposes of this invention are well-known compounds and include alkyl mercaptans, mercapto esters, mercapto alcohols, and mercapto carboxylic acids. See, for example, U.S. Pat. Nos. 3,503,924 and 3,507,827. Alkyl mercaptans having from 1 to about 200 carbon atoms and from 1 to 4 mercapto groups are suitable. They include, but are not limited to, the following compounds which encompass the S-$R^1$ group:

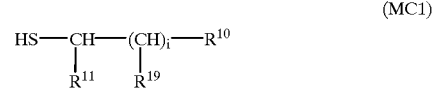 (MC1)

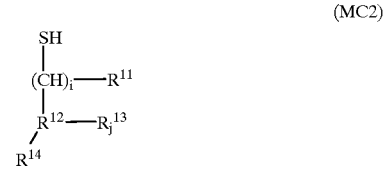 (MC2)

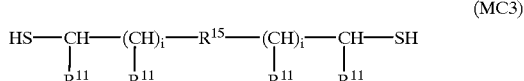 (MC3)

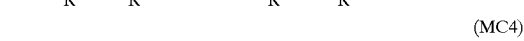 (MC4)

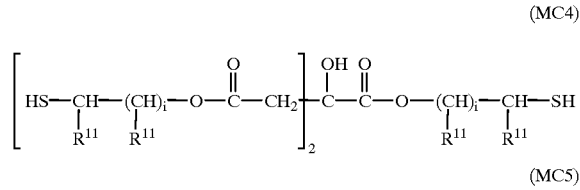 (MC5)

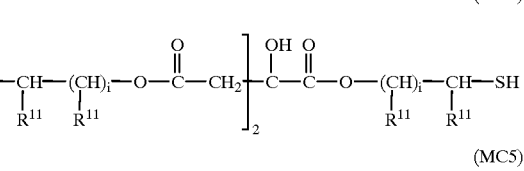 (MC6)

wherein $R^{10}$ and $R^{19}$ are the samue or different and are

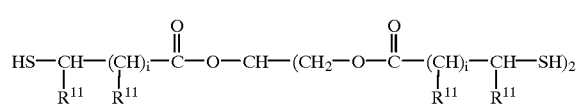

—OH, —SH, aryl, $C_1$, to $C_{18}$, alkyl, or —H;

$R^{11}$ is —H, aryl, or $C_1$ to $C_{18}$ alkyl;

$R^{12}$ is cycloalkyl, cycloalkenyl or phenyl;

$R^{13}$ is

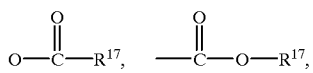

—SH, aryl, $C_1$ to $C_{18}$ alkyl, —OH or —H with the proviso that in formula (MC2) when $R^{12}$ is phenyl, $R^{13}$ is —OH and i=0, then the —SH groups are on non-adjacent carbon atoms;

$R^{14}$ is —H or a divalent group which may contain halogen, hydroxy, mercapto or alkyl substituents and which when $R^{12}$ is phenyl combines with the phenyl to form a naphthalene ring;

$R^5$ is

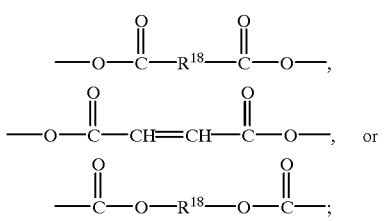

$R^{16}$ is —$CH_3$, —$CH_2CH_3$, or

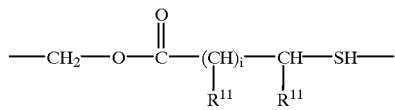

$R^{17}$ is —H, or alkyl, alkenyl, aryl, aralkyl, alkaryl, cycloalkyl, cycloalkylenyl;

$R^{18}$ is arylene, $C_1$ to $C_8$ alkylenyl,

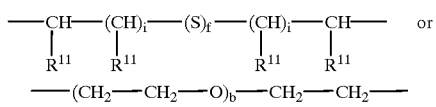

wherein b is an integer from 1 to 6;

i=0 or an integer from 1 to 6 inclusive;

j=0, 1, 2 or 3; and f=1 or 2.

Mercaptan-containing organic compounds preferred as intermediates in the preparation of the latent mercaptans of this invention are compounds according to formula (MC1) where $R^{11}$ is —H, $R^{19}$ is —H, $R^{10}$ is OH or

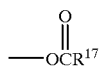

and i=1; those compounds according to formula (MC2) where $R^{12}$ is phenyl, $R^{11}$ is —H, $R^{13}$ is —H, $R^{14}$ is —H, i=1, and j=1; those compounds according to formula (MC3) where $R^{11}$ is —H, $R^{15}$ is

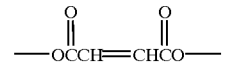

and i=1; those compounds according to formula (MC4) where $R^{11}$ is —H and i=1; those compounds according to formula (MC5) where $R^{16}$ is —$C_2H_5$ or

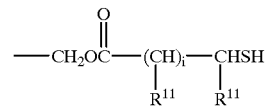

$R^{11}$ is —H and i=1; and those compounds according to formula (MC6) where $R^{11}$ is —H and i=1.

Examples of the mercaptan-containing organic compounds described by formula (MC1) include, but are not limited to, the following compounds:

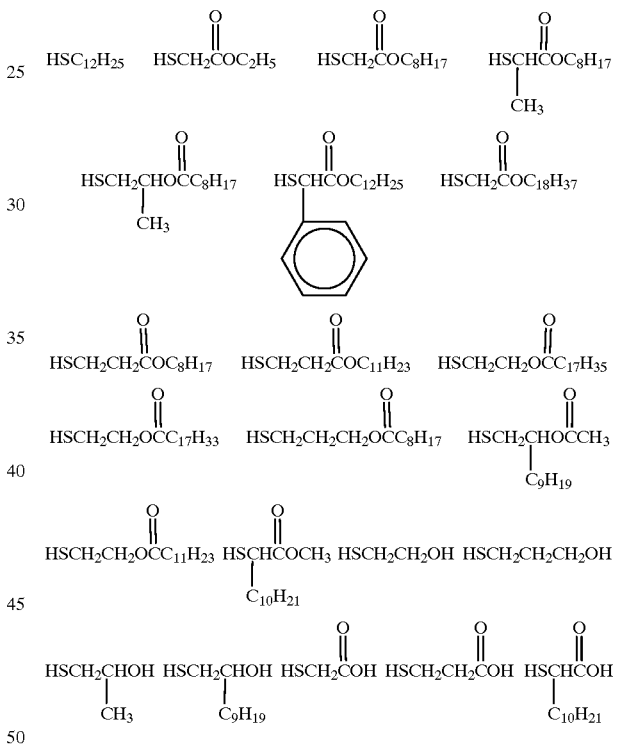

Examples of the mercaptan-containing organic compounds described by formula (MC2) include, but are not limited to, the following compounds:

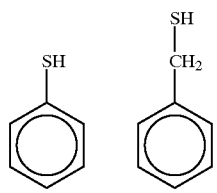

Examples of mercaptan-containing organic compounds represented by formula (MC3) include, but are not limited to the following compounds:

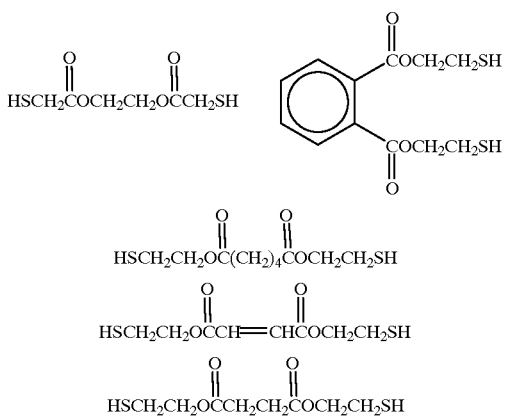

The mercaptan-containing organic compounds described by formula (MC4) are exemplified by, but are not limited to, the following:

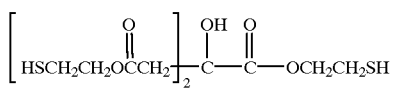

The mercaptan-containing organic compounds represented by formula (MC5) are exemplified by, but are not limited to, the following:

The mercaptan-containing organic compounds represented by formula (MC6) are exemplified by, but are not limited to, the following:

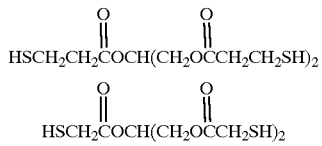

The formula (MC1) and (MC4) mercaptan compounds are especially preferred.

One of the advantages of this invention is that the offensive odor of the mercaptans is masked by the blocking group so that the latent mercaptan thus created may be put into a PVC composition or the like with little or no offense to the operator with the knowledge that the free mercaptan will be released as a degradation product when the treated composition is heated during the usual processing, e.g. extrusion.

The blocking compounds are preferably those which are capable of furnishing a stabilized carbocation having a molecular structure in which the electron deficiency is shared by several groups. Resonance stabilization and neighboring group stabilization are two of the possible mechanisms by which the carbocations may be stabilized. Polarized, unsaturated compounds exemplified by 3,4-dihydropyran, 2-methoxy-3,4-dihydropyran, styrene, α-methylstyrene, vinyl benzyl chloride, indene, 2-vinylpyridine, N-vinylpyrrolidone, vinyl acetate, octadecyl vinyl ether, cyclohexyl divinyl ether, ethyleneglycol monovinyl ether, allyl phenyl ether, trans-cinnamaldehyde, N-methyl-N-vinylacetamide, N-vinylcaprolactam, isoeugenol, and 2-propenylphenol are suitable. Compounds having labile halogen atoms which split off as hydrogen chloride in a condensation reaction with the mercaptan, as exemplified by triphenylmethyl chloride, benzyl chloride, and bis(chloromethyl)benzene, are also suitable. The mercaptan may also be blocked by condensation with an aldehyde such as butyraldehyde or with a benzyl alcohol such as benzene dimethanol. A preferred blocking agent is 2-hydroxybenzyl alcohol, a well known intermediate in the perfume, agricultural, and plastics industries.

Especially preferred polarized, unsaturated compounds, are exemplified by above mentioned 3,4-dihydropyran, and its derivatives, such as 3,4-dihydro-2-methoxy-2H-pyran, 3,4-dihydro-2-ethoxy-2H-pyran, 3,4-dihydro-2-phenoxy-2H-pyran, 3,4-dihydro-2-2=a formyl-2H-pyran, and its homologs such as 2,3-dihydrofuran and derivatives. The 3,4-dihydro-2-formyl-2H-pyran is made by the Diels-Alder dimerization of acrolein at high temperatures and pressures. The 3,4-dihydro-2-alkoxy-2H-pyrans and 3,4-dihydro-2-phenoxy-2H-pyran are made by the reaction of the corresponding vinyl ether with acrolein in the presence of a catalytic amount of a zinc salt, e.g., zinc chloride. A variety of 3,4-dihydro-2H-pyrans having a substituent in the 2-position can be made by similar reactions. The products formed by the reaction of 1 and 2 moles of acrolein with the divinyl ether of an alkylene- or polyalkylene glycol are blocking agents, also. The latent mercaptans made from the di-(3,4-dihydropyranyl) ethers also have the potential of being chelating agents in the polymer compositions of this invention. In the case of the reaction of one mole of acrolein per mole of a divinyl ether, the vinyl ether group of the resulting monomer permits the product to be incorporated into a vinyl chloride copolymer followed by the addition of a mercaptan across the double bond of the pyran ring to yield a latent mercaptan that is an integral stabilizer for the polymer. The reaction of one mole of acrolein with one mole of the divinyl ether also allows for the formation of a monomeric latent mercaptan of the mercaptan/tetrahydropyran adduct type in which the vinyl ether group of the resulting monomer permits the product to be copolymerized with one or more of a wide variety of ethylenically unsaturated compounds to form polymeric latent mercaptans. The product from the reaction of acrolein with chloroethyl vinyl ether provides a substituted 3,4-dihydropyran that can be further derivatized. The addition of a mercaptan across the double bond of the pyran ring can be done in the presence of the zinc salt catalyst to yield a stabilizer composition of this invention.

In general, the procedure for adding the mercapto group of a free mercaptan across the double bonds of polarized, unsaturated compounds is:

To a stirred mixture of the mercaptan, acid catalyst, and optionally, a small percentage of antioxidant to inhibit radical reactions, under nitrogen atmosphere is added dropwise the polarized, unsaturated compound, either neat or in solution, while maintaining the temperature between 10°–70° C. The mixture or solution is then heated for between 1 to 6 hours at 35°–70° C. and conversion to product is monitored by gas chromatography and iodine titration for SH. The acid catalyst is removed by an alkaline wash and the resulting product is dried with magnesium sulfate and filtered. The solvent, if required, is removed under reduced pressure at <50° C. to yield the latent mercaptan. A solid phase catalyst may be used and then filtered out of the reaction mixture and regenerated for use in a subsequent synthesis, In this way, a wash step is eliminated. This generalized procedure is referred to hereinafter as Procedure A.

In accordance with Procedure A, for example, mercaptoethanol is added across the double bond of N-vinylcaprolactam to yield N-2-hydroxyethylthioethylcaprolactam. Mercaptoethyldecanoate (or mercaptoethylcaproate; or mercaptoethyl tallate) reacts with 3,4-dihydropyran in that procedure to give 2-S-(tetrahydropyranyl) thioethyldecanoate (or 2-S-(tetrahydropyranyl) thioethylcaproate; or 2-S-(tetrahydropyranyl) thioethyltallate). Bis (hydroxyethylthioethyl) cyclohexyl ether is made from the mercaptoethanol and cyclohexyl di-vinyl ether. In like manner, the corresponding caprate, oleate, and tallate esters form the corresponding cyclohexyl ethers. Also, indene is converted by the addition of the mercaptoethanol to 2H-dihydroindenylthio-ethanol.

A generalized procedure for the condensation of a free mercaptan with a labile halogen-containing compound is as follows:

To a stirred mixture of the mercaptan and halogen-containing compound under nitrogen atmosphere is added dropwise a solution of sodium methoxide in methanol while maintaining the temperature below 50° C. Optionally, the reaction is allowed to proceed without the addition of a base source and the liberated hydrogen chloride is removed by nitrogen gas sweep and neutralized with the use of an external acid scrubber. The mixture or solution is then heated for between 2 to 24 hours at 50°–70 C. and conversion to product is monitored by gas chromatography and iodine titration for %SH. The product is then neutralized, washed with water, dried with magnesium sulfate, and filtered. The solvent, if required, is removed under reduced pressure at <50° C. to yield the latent mercaptan. This generalized procedure is referred to hereinafter as Procedure B.

A generalized procedure for the condensation of a free mercaptan with a labile hydroxyl-containing compound is as follows:

To a stirred solution of the mercaptan, acid catalyst, and solvent under nitrogen atmosphere is added the hydroxy-containing compound either neat or in solution while maintaining the temperature <45° C. The solution is then heated to 45°–75° C. for between 1 to 10 hours and conversion to product is monitored by gas chromatography and iodine titration for % SH. Optionally, an azeotropic solvent is chosen for removal of reaction water by an appropriate means at reflux temperatures, typically 60°–120° C. Completion of reaction is achieved after the theory amount of water has been collected. The acid catalyst is removed by alkaline wash and the resulting solution is dried with magnesium sulfate and filtered. The solvent is removed under reduced pressure at <55° C. to yield the latent mercaptan. This procedure is referred to hereinafter as Procedure C.

For example, 2-hydroxybenzyl alcohol condenses with mercaptoethanol in accordance with Procedure C to form 1-(2-hydroxyphenyl)-1-S-(2-hydroxyethylthio)methane.

A generalized procedure for the reaction of a free mercaptan with a glycidyl ether is as follows:

To a stirred mixture of the mercaptan and acid catalyst under nitrogen atmosphere is added the glycidyl ether, either neat or in solution, while maintaining the temperature between 25°–60° C. The mixture or solution is then heated to between 50°–75° C. for a period of 1 to 6 hours and conversion to product is monitored by gas chromatography and iodine titration for %SH. The acid catalyst is removed by alkaline wash, the resulting product is dried with magnesium sulfate, and filtered. The solvent, if required, is removed under reduced pressure at <55° C. to yield the latent mercaptan. For example, the reaction between mercaptoethanol and glycidyl neodecanoate gives $C_9H_{19}C(=O)OCH_2CH(OH)CH_2SCH_2CH_2OH$. This procedure is referred to hereinafter as Procedure D.

A generalized procedure for the condensation of a free mercaptan with an aldehyde is as follows:

To a stirred solution of the mercaptan, acid catalyst, and azeotropic solvent under nitrogen atmosphere is added the aldehyde with heating to reflux, typically between 65°–120° C., for removal of reaction water. Completion of reaction is achieved after the theory amount of water has been collected. Optionally, to a stirred solution of mercaptan, aldehyde, and ether is added $BF_3$-etherate dropwise under reflux conditions. The solution is refluxed for between 1 to 6 hours and conversion to product is monitored by gas chromatography. The acid catalyst is removed by alkaline wash, the solution is dried with magnesium sulfate and filtered. The solvent is removed under reduced pressure at <65° C. to yield the latent mercaptan. This generalized procedure is referred to hereinafter as Procedure E.

Examples of the blocked mercaptans of this invention include compounds having the following formulas, as each relates to FORMULA 1:

FORMULA

2.

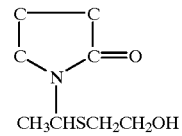

$CH_3CHSCH_2CH_2OH$ a=1, m=1, n=0; y=1, z is 1; X is nitrogen, $R^6$ and $R^7$ are joined to form —$CH_2$—$CH_2$-$CH_2$—C=(O)—; $R^4$ is hydrogen; $R^5$ is methyl; and $R^1$ is hydroxyethyl.

3.

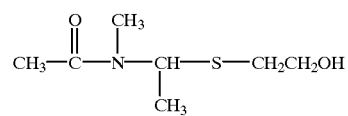

a=1, m=1, n=0; y=1, z is 1; X is nitrogen, $R^6$ is acetyl, $R^7$ is methyl, $R^5$ is methyl, $R^4$ is hydrogen, and $R^1$ is hydroxyethyl.

4.

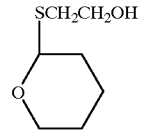

a=1, m=0, n=0; y=1, z is 1; X is oxygen, $R^5$ and $R^7$ are joined to form —$CH_2$—$CH_2$—$CH_2$—$CH_2$—; $R^4$ is hydrogen, and $R^1$ is hydroxyethyl.

5.

[structure: tetrahydropyran with SCH2CH2OH substituent]

a=1, m=0, n=1, y=1, z=1; X is oxygen, $R^3$ and $R^7$ join to form —$CH_2$—$CH_2$—$CH_2$—; $R^2$, $R^4$ and $R^5$ are hydrogen, and $R^1$ is hydroxyethyl.

6.

[structure: tetrahydropyran-S-CH2-CH2-O-tetrahydropyran]

a=1, m=0, n=0, y=1, z=1; X is oxygen, $R^5$ and $R^7$ join to form —$CH_2$—$CH_2$—$CH_2$—$CH_2$—; $R^4$ is hydrogen, and $R^1$ is 2-ethoxytetrahydropyranyl.

7.

[structure with SCH2CH2O linking two tetrahydropyrans]

a=1, m=0, n=0, y=1, z=1; X is oxygen, $R^5$ and $R^7$ join to form —$CH_2$—$CH_2$—$CH_2$—$CH_2$—; $R^4$ is hydrogen, and $R^1$ is 3-ethoxytetrahydropyranyl.

8.

[structure with OCH2CH2S linking two tetrahydropyrans]

a=1, m=0, n=1, y=1, z=1; X is oxygen, $R^3$ and $R^7$ join to form —$CH_2$—$CH_2$—$CH_2$—; $R^2$, $R^4$ and $R^5$ are hydrogen, and $R^1$ is 2-ethoxytetrahydropyranyl.

9.

[structure with OCH2CH2S linking two tetrahydropyrans]

a=1, m=0, n=1, y=1, z=1; X is oxygen, $R^3$ and $R^7$ join to form —$CH_2$—$CH_2$—$CH_2$—; $R^2$, $R^4$ and $R^5$ are hydrogen, and $R^1$ is 3-ethoxytetrahydropyranyl.

10a.

[structure: phenyl-CH(CH3)-SCH2CH2OH]

a=0, m=0, n=0, y=1, z=1; X is phenyl, $R^4$ is methyl, $R^5$ is hydrogen, and $R^1$ is hydroxyethyl.

10b.

[structure: phenyl-CH2-CH2-S-CH2CH2OH]

a=0, m=0, n=1, y=1, z=1, X is phenyl, $R^2$, $R^3$, $R^4$, and $R^5$ are hydrogen, and $R^1$ is hydroxyethyl.

11.

[structure: phenyl-CH2SCH2CH2OH]

a=0, m=0, n=0, z=1; y=1, X is phenyl, $R^4$ and $R^5$ are hydrogen, and $R^1$ is hydroxyethyl.

12.

[structure: o-hydroxyphenyl-CH2SCH2CH2OH]

a=1, m=0, n=0, y=1, z=1; X is phenyl, $R^4$ and $R^5$ are hydrogen, $R^7$ is o-hydroxy, and $R^1$ is hydroxyethyl.

13.

[structure: phenyl-CH2SCH2COCH2CH2SH]

a=0, m=0, n=0, y=1, z=1; X is phenyl, $R^4$ and $R^5$ are hydrogen, and $R^1$ is mercaptoethoxycarbonylmethyl.

14.

[structure: phenyl-OCH2CH(CH3)SCH2CH2OH]

a=1, m=0, n=1, y=1, z=1; X is oxygen, $R^2$, $R^4$ and $R^5$ are hydrogen, $R^3$ is methyl, $R^7$ is phenyl, and $R^1$ is hydroxyethyl.

15.
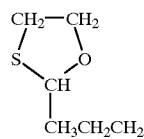

a=1, m=0, n=0, y=1, z=1; X is oxygen, $R^7$ and $R^1$ are joined to form an ethylenyl radical, $R^4$ is hydrogen, and $R^5$ is propyl.

16.
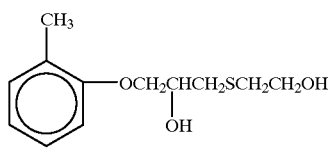

a=0, m=1, n=1, y=1, z=1; X is oxygen, $R^2$, $R^3$, $R^6$ and $R^4$ are hydrogen, $R^5$ is 2-methyleneoxytolyl, and $R^1$ is hydroxyethyl.

17.
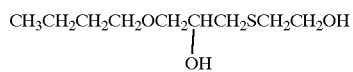

a=1, m=0, n=1, y=1, z=1; X is oxygen, $R^2$, $R^3$, $R^4$ and $R^7$ are hydrogen, $R^5$ is butoxymethyl, and $R^1$ is hydroxyethyl.

18.
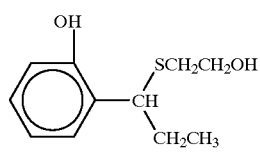

a=1, m=0, n=0, y=1, z=1; X is phenyl, $R^4$ is hydrogen, $R^5$ is ethyl, $R^7$ is o-hydroxy, and $R^1$ is hydroxyethyl.

19.
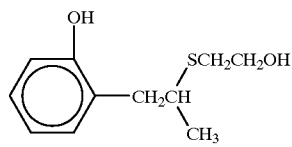

a=1, m=0, n=1, y=1, z=1; X is phenyl, $R^3$, $R^4$ and $R^5$ are hydrogen, $R^2$ is methyl, $R^7$ is o-hydroxy, and $R^1$ is hydroxyethyl.

20.
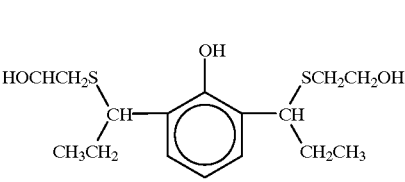

a=1, m=0, n=0, y=1, z=2; X is phenyl, $R^4$ is hydrogen, $R^5$ is ethyl, $R^7$ is o-hydroxy, and $R^1$ is hydroxyethyl.

21.
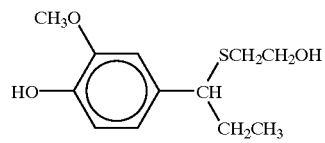

a=1, m=0, n 0, y=1, z=1; X is m-methoxyphenyl, $R^4$ is hydrogen, $R^5$ is ethyl, $R^7$ is p-hydroxy, and $R^1$ is hydroxyethyl.

22.
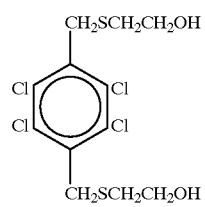

a=0, m=0, n=0, y=1, z=2; X is tetrachlorophenyl, $R^4$ and $R^5$ are hydrogen, and $R^1$ is hydroxyethyl.

23.
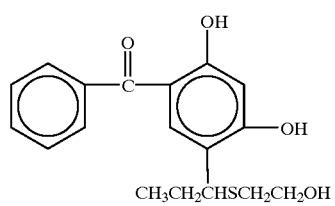

a=1, m=0, n=0, y=1, z=1; X is o,p-dihydroxyphenyl, $R^7$ is m-phenylcarbonyl, $R^4$ is hydrogen, $R^5$ is —$CH_2CH_3$, and $R^1$ is hydroxyethyl.

24.
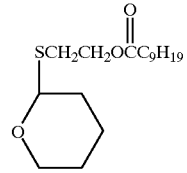

a=1, m=0, n=0; y=1, z is 1; X is oxygen, $R^5$ and $R^7$ are joined to form —$CH_2$—$CH_2$—$CH_2$—$CH_2$—; $R^4$ is hydrogen, and $R^1$ is decanoyloxyethyl.

25.
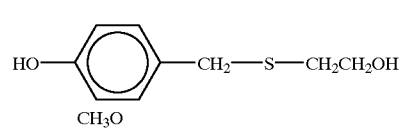

a=1, m=0, n=0; y=1, z is 1; X is p-hydroxyphenyl, $R^4$ and $R^5$ are hydrogen, $R^7$ is m-methoxy, and $R^1$ is hydroxyethyl.

26.
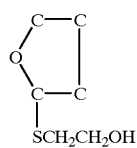

27.
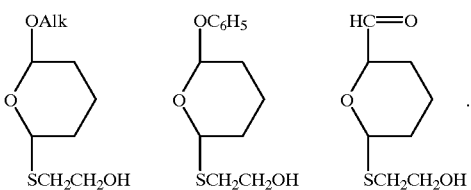

The compounds employed in combination with the latent mercaptans in the practice of this invention are free phenyl salicylate compounds. The term "free phenyl salicylate" as used herein means that the phenyl salicylate is used independently, i.e., is physically combined, in the stabilizer composition of this invention instead of being provided as a ligand that is directly bond to a tin atom.

The phenyl salicylates suitable for the purposes of this invention are represented by FORMULA 2:

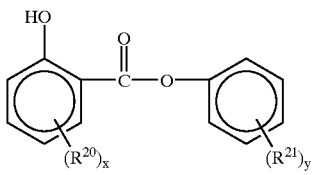

(II)

wherein $R^{20}$ and $R^{21}$ are at each independent occurrence selected from hydrogen, an alkyl, phenyl, alkoxy, phenoxy, alkylcarboxy, hydroxyl, halogen, carboxyl, benzoyl, glycidyl, glycidylamino, alkylamino, amido, hydroxypolyalkoxy, alkoxypolyalkoxy, or acyloxypolyalkoxy radical, x is any integer from 1 to 4, and y is any integer from 1 to 5. Preferred phenyl salicylates are those of Formula II wherein $R^{20}$ is hydrogen and x is 4, and either $R^{21}$ is a hydrogen atom and y is 5, or $R^{21}$ is an alkyl radical having from about 1 to 12 carbon atoms and y is 1.

Phenyl salicylate compounds exemplified by phenyl salicylate, 2'-dodecylphenyl salicylate, 4'-methoxyphenyl salicylate, 4-methoxyphenyl salicylate, 4'-chlorophenyl salicylate, 4-acetamidophenyl salicylate, 1-hydroxy-2-5 phenylnaphthoate, 5-chlorophenyl salicylate, and 4-N-glycidylaminophenyl salicylate are suitable, although phenyl salicylate and 2'-dodecylphenyl salicylate represent the preferred structures. The prime (') denotes $R^{21}$ substituents, and the $R^{20}$ substituents are unprimed. Those skilled in the art will understand that derivatives of the phenyl salicylates, for example, corresponding anilide or pyridinyl structures, may also be employed, although currently such derivatives are not preferred in view of their relatively lower heat stability.

These phenyl salicylates can be prepared by standard teaching as well known in the art.

As used in the above formulas and throughout this specification unless otherwise indicated, the named organic radicals are straight or branched chain radicals which contain, for example, from about 1 to 20 carbon atoms, and the term poly refers to 2 or more repeat units of the named radical.

As stated above, the stabilizer compositions of the present invention comprise a latent mercaptan as the sole heat stabilizer or in a system comprising a metal-based stabilizer, a Lewis Acid an organic-based stabilizer, or a hydrotalcite-based stabilizer in admixture with the latent mercaptan. Metal-based stabilizers are defined for the purposes of this invention as metal salt stabilizers and organometallic stabilizers. Metal salts are defined to include oxides, hydroxides, sulfides, sulfates, chlorides, bromides, fluorides, iodides, phosphates, phenates, perchlorates, carboxylates, and carbonates. The metal salt stabilizers are exemplified by barium, strontium, calcium, cadmium, zinc, lead, tin, magnesium, cobalt, nickel, titanium, antimony, and aluminum salts of phenols, aromatic carboxylic acids, fatty acids, epoxidized fatty acids, oxalic acid, carbonic acid, sulfuric acid, and phosphoric acid. Calcium stearate, calcium 2-ethylhexanoate, calcium octoate, calcium oleate, calcium ricinoleate, calcium myristate, calcium palmitate, calcium laurate, barium laurate, barium stearate, barium di(nonylphenolate), magnesium stearate, zinc stearate, zinc octoate (or caprylate), zinc 2-ethylhexanoate, zinc stearate, zinc laurate, zinc oxide, zinc chloride, zinc hydroxide, zinc sulfide, zinc sulfate, zinc bromide, cadmium laurate, cadmium octoate, cadmium stearate, sodium stearate and other Group I and II metal soaps are examples of suitable salts. Other metal salts such as lead stearate, tin stearate, aluminum stearate, and hydrotalcite, etc, can be used. Metal salt stabilizers may constitute from about 0.01 to about 10%, preferably 0.1–5% by weight of the halogen containing resin.

Conventional organometallic stabilizers include the organotin carboxylates and mercaptides. Such materials include butyltin tris dodecyl mercaptide, dibutyltin dilaurate, dibutyltin didodecyl mercaptide, dianhydride tris dibutylstannane diol, dihydrocarbontin salts of carboxy mercaptals such as those set forth in Hechenbleikner et al. (U.S. Pat. No. 3,078,290). There can be included any of the vinyl chloride resin stabilizers set forth in Salyer (U.S. Pat. No. 2,985,617).

Preferred organotin mercaptides are exemplified by mono- and di-$C_1$–$C_{12}$alkyltin mercaptides of alkylthioglycolates, such as monomethyltin tris(2-ethylhexylthioglycolate), dimethyltin bis(2-ethylhexylthioglycolate), monobutyltin tris(2-ethylhexylthioglycolate), dibutyltin bis(2-ethylhexylthioglycolate), monooctyltin tris(2-ethylhexylthioglycolate), and dioctyltin bis(2-ethylhexylthioglycolate), and mono- and di-$C_1$–$C_{12}$alkyltin mercaptides of mercaptoalkyl carboxylates, such as monomethyltin tris (mercaptoethyloleate), dimethyltin bis (mercaptoethyloleate), monobutyltin tris (mercaptoethylpelargonate), and dibutyltin bis (mercaptoethylpelargonate). Preferred organotin carboxylates are exemplified by mono- and di-$C_1$–$C_{12}$alkyltin carboxylates, such as monobutyltin tris(dodecylmaleate), dibutyltin bis(butyl maleate), diethyltin azelate, diethyltin dilaurate, dimethyltin dibenzoate, dimethyltin bis(butyl carbitol maleate), and dimethyl bis(tetraethylene glycol maleate), and oligomeric and polymeric salts thereof. Particularly useful in the practice of this invention are mixtures of mono- and di-alkyltin mercaptides.

The mono-organotin compounds and diorganotin compounds useful in the compositions of this invention may be prepared by methods well-known in the art such as the reaction of a mono- or dialkyltin chloride with a mercaptoalkyl carboxylate or an alkyl thioglycolate in the presence of a base to scavenge hydrogen chloride. Methyltin trichloride, dimethyltin dichloride, butyltin trichloride, dibutyltin dichloride, ethylhexyltin trichloride, and dioctyltin dichloride are examples of organotin halides that are suitable for the preparation of useful stabilizers for this invention. See for example, U.S. Pat. Nos. 3,565,930, 3,869,487, 3,979,359, 4,118,371, 4,134,878 and 4,183,846 all of which are incorporated herein by reference.

Monosulfides and/or polysulfides of the organotin mercaptides of mercaptoalkyl carboxylates and/or of alkyl thioglycolates are also suitable as metal based stabilizers in the compositions of this invention for improving the resistance of halogen-containing polymers to deterioration when heated to 350° F. (177° C.) during processing. Said sulfides are made by heating stoichiometric quantities of a mercaptoalkyl ester or alkylthiocarboxylate and an organotin chloride in water and ammonium hydroxide to about 30° C., slowly adding an alkali-metal mono- or polysulfide, and heating the reaction mixture further to about 45° C. before separating the product from said mixture. Alternatively, the sulfide may be made by mixing a monoalkyl- or dialkyltin sulfide with an organotin mercaptide and by other procedures well known in the stabilizer art.

The sulfides of the alkyltin mercapto-carboxylic esters or mercaptoalkylcarboxylic esters may be characterized by an equilibrium mixture of one or more alkyltin halides, one or more organotin mercaptides, and one or more alkyltin mono- or polysulfides or oligomers thereof. It should be understood that the structures of the sulfides produced by the processes mentioned above are very complex. The reactions are believed to produce an equilibrium mixture composed of several different but related products. As will be appreciated by those of ordinary skill in chemistry, equilibrium mixtures inherently include the starting materials as well as the products of any reaction between them. The chemical and patent literature contain numerous examples demonstrating that members of different classes of organotin compounds may react with one another under certain conditions to yield products containing one or more tin atoms wherein at least a portion of the tin atoms are bonded to different combinations of radicals than they were before being mixed together. Accordingly, the sulfides are believed to include bis[monoorganotin)-bis(thioalkyl carboxylate)] monosulfides and polysulfides, bis[(diorganotin)-mono(thioalkyl carboxylate)]monosulfides and polysulfides, and products which arise during equilibrium reactions among said mono- and polysulfides, including monoalkyltin tris(thioalkyl carboxylates), dialkyltin bis(thioalkyl carboxylates), mono- and di-organotin mono- and polysulfides, and oligomers thereof, as well as the starting materials themselves. The sulfide of an alkyl ester of a mercaptocarboxylic acid is likewise believed to include bis[monoorganotin)-bis(alkyl mercaptocarboxylate)] monosulfides and polysulfides, bis[(diorganotin)-mono(alkyl mercaptocarboxylate)] monosulfides and polysulfides, and products which arise during equilibrium reactions among said mono- and polysulfides, including monoalkyltin tris(alkyl mercaptocarboxylates), dialkyltin bis(alkyl mercaptocarboxylates), mono- and di-organotin mono- and polysulfides, and oligomers thereof.

The polysulfides include mixtures of compounds having from 2 to 10 sulfur atoms linked together. Mixtures of monosulfides and polysulfides having from 2 to 4 sulfur atoms are preferred.

The organometallic stabilizers may constitute from about 0.01 to about 10%, preferably 0.1–5% by weight of the halogen containing resin.

Other stabilizers which may be used in combination with the latent mercaptan include Lewis acids. The Lewis acids are exemplified by boron trifluoride, aluminum chloride, zinc chloride and methyltin trichloride. Thus, there is some overlap between the metal salts and Lewis acids that are useful in this invention. The synergistic amounts of the Lewis acids for the purposes of this invention are from about 0.005 to 0.5%, preferably from 0.01 to about 0.1% by weight of the halogen-containing resin. The Lewis acids and the metallic-based stabilizers may be used in combination.

Conventional non-metallic stabilizers can also be included in the stabilizer compositions of the present invention to assist in improving the properties of the halogen containing resin.

Thus, there can be included 0.01–10%, preferably 0.1–5% based on the halogen-containing resin of sulfur containing compounds such as dilauryl-thiodipropionate, distearyl 3,3'-thiodipropionate, dicyclohexyl-3,3-thiodipropionate, dioleyl-3,3'-thiodipropionate, dibenzyl-3,3'-thiodipropionate, didecyl-3,3'-thiodipropionate, dibenzyl-3,3'-thiodipropionate, diethyl-3,3'-thiopropionate, lauryl ester of 3-methylmercaptopropionic acid, lauryl ester of 3-butylmercaptopropionic acid, lauryl ester of 3-lauryl mercaptopropionic acid, and phenyl ester of 3-octyl mercaptopropionic acid.

In addition to the stabilizer compositions of this invention, there can also be incorporated into the halogen-containing organic polymer conventional additives such as plasticizers, as mentioned above in regard to flexible PVC, blowing agents, dyes, co-ultraviolet light absorbing agents, antioxidants, densifying agents, biocides, impact modifiers, processing aids, co-stabilizers, toners, and the like.

The halogen-containing polymer compositions that are stabilized by the stabilizer compositions of this invention are generally limited to clear formulations. These formulations thus contain little or no pigments or fillers that will render them opaque. While not wishing to be bound by any particular theory, it is believed that in clear formulations, sufficient energy (hv) is provided to allow photo-fries rearrangement in situ of the phenyl salicylate compound to its corresponding, functionally active, benzophenone type structure, which is capable of absorbing high levels of ultraviolet radiation throughout the clear polymer composition. While in pigmented or filled (i.e., opaque) formulations, it is believed that photo-fries arrangement of the phenyl salicylate compound to its functionally active form is prevented for the most part.

An antioxidant may be added in an amount of 0.01–10%, preferably 0.1–5% by weight of the resin. Phenolic antioxidants are particularly suitable and are exemplified by 2,6-di-t-butyl-p-cresol, butylated hydroxyanisole, propyl gallate, 4,4'-thiobis(6-t-butyl-m-cresol), 4,4'-cyclohexylidene diphenol, 2,5-di-t-amyl hydroquinone, 4,4'-butylidene bis(6-t-butyl-m-cresol), hydroquinone monobenzyl ether, 2,2'-methylene-bis(4-methyl-6-t-butyl phenol), 2,6-butyl-4-decyloxy phenol, 2-t-butyl-4-dodecyloxy phenol, 2-t-butyl-4-dodecyloxy phenol, 2-t-butyl-4-octadecyloxy phenol, 4,4'-methylene-bis(2,6-di-t-butyl phenol), p-amino phenol, N-lauryloxy-p-amino phenol, 4,4'-thiobis(3-methyl-6-t-butyl phenol), bis [o-(1,1,3,3-tetramethyl butyl)phenol] sulfide, 4-acetyl-β-resorcylic acid, A-stage p-t-butylphenolformaldehyde resin, 4-dodecyloxy-2-hydroxybenzophenone, 3-hydroxy-4-(phenylcarbonyl) phenyl palmitate, n-dodecyl ester of 3-hydroxy-4-(phenyl carbonyl) phenoxyacetic acid, and t-butyl phenol.

The use of epoxy co-stabilizer compounds in an amount of 0.01–30% in the polymer compositions is also valuable. Examples of such epoxy compounds include epoxidized soya bean oil, epoxidized lard oil, epoxidized olive oil, epoxidized linseed oil, epoxidized castor oil, epoxidized peanut oil, epoxidized corn oil, epoxidized tung oil, epoxidized cottonseed oil, epichlorhydrin/bisphenol A resins, phenoxypropylene oxide, butoxypropylene oxide, epoxidized neopentylene oleate, glycidyl epoxystearate, epoxidized α-olefins, epoxidized glycidyl soyate, dicyclopentadiene dioxide, epoxidized butyl toluate, styrene oxide, dipentene dioxide, glycidol, vinyl cyclohexene dioxide, glycidyl ether of resorcinol, glycidol ether of hydroquinone, glycidyl ether of 1,5-dihyroxynaphthalene, epoxidized linseed oil fatty acids, allyl glycidyl ether, butyl glycidyl ether, cyclohexane oxide, 4-(2,3-epoxypropoxy) acetophenone, mesityl oxide epoxide, 2-ethyl-3-propyl glycidamide, glycidyl ethers of glycerine, pentaerythritol and sorbitol, and 3,4-epoxycyclohexane-1, 1-dimethanol bis-9,10-epoxystearate.

Likewise there can be used organic phosphites in an amount of 0.01 to 10%, preferably 0.1–5% of the halogen containing resin. The organic phosphites contain one or more, up to a total of three, aryl, alkyl, aralkyl and alkaryl groups, in any combination. The term "trialkylaryl" is inclusive of alkyl, aryl, alkaryl and aralkyl phosphites containing any assortment of alkyl, aryl, alkaryl and aralkyl groups. Exemplary are triphenyl phosphite, tricresyl phosphite, tri (dimethylphenyl) phosphite, tributyl phosphite, trioctyl phosphite, tridodecyl phosphite, octyl diphenyl phosphite, dioctyl phenyl phosphite, tri(octyl-phenyl) phosphite, tri (nonylphenyl) phosphite, tribenzyl phosphite, butyl dicresyl phosphite, octyl di(octyl-phenyl) phosphite, tri(2-ethyl-hexyl) phosphite, tritolyl phosphite, tri(2-cyclohexylphenyl) phosphite, tri-alpha-naphthyl phosphite, tri(phenylphenyl) phosphite, and tri(2-phenylethyl) phosphite.

Likewise there can be included polyol stabilizers for vinyl chloride resins in an amount of 0.01–10% by weight. Thus there can be included glycerol, sorbitol, pentaerythritol and mannitol and polyethers such as diethylene glycol, triethylene glycol, tetraethylene glycol, tripropylene glycol, and the like.

Nitrogen containing stabilizers such as dicyandiamide, melamine, urea, formoguanamine, dimethyl hydantoin, guanidine, thio-urea, 2-phenylindoles, aminocrotonates, N-alkyl and N-phenyl substituted maleimides, wherein the alkyl group has from 1 to 4 carbon atoms, uracil and the like also can be included in amounts of 0.1–10% by weight of the halogen-containing resin. Particularly interesting compounds are the 1,3-dialkyl-6-amino-uracil derivatives described in German Offenlegungsschrift 19,741,778 by Ciba Specialty Chemicals Holding Inc., and the pyrrolodiazine diones described in published Australian Patent Application No. AU-A-48232/96 by Ciba-Geigy, and the like also can be included in amounts of 0.1–10% by weight. Of particular interest are the pyrrolodiazine diones described by the formula:

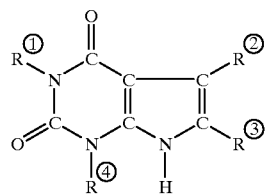

wherein $R^{①}$, $R^{②}$, $R^{③}$, and $R^{④}$ are independently hydrogen or $C_1$–$C_4$ alkyl. Examples of compounds contemplated for use in this invention include the 1H-pyrrolo[2,3-d] pyrimidine-2,4(3H,7H)-diones exemplified by Compound Nos. 103, 111, 123, 129, and 131 of said Australian Pat. Application, which have the following substituents:

No. 103 1,3,6-trimethyl;
No. 111 1,3,6,7-tetramethyl;
No. 123 none;
No. 129 1,3-diethyl,6-methyl;
No. 131 1,3-di-n-butyl,6-methyl;

Said compounds may be prepared by the method described by S. Senda and K. Hirota, Chem. Pharm. Bull., 22(7), 1459–1467(1974) or by the reaction of the corresponding aminouracil with molar excesses of chloroacetaldehyde and ammonium acetate in water at about 65° C. until a precipitate forms or with molar excesses of acetoxyacetone and ammonium acetate in water at reflux for 12 hours. The German offenlegungsschrift 19,741,778 and the Australian Patent Application No. AU-A-48232/96 are each incorporated herein by reference.

There can even be included conventional lubricants for vinyl chloride resins such as low molecular weight polyethylene, i.e. polyethylene wax, fatty acid amides, e.g. lauramide and stearamide, bisamides, e.g. decamethylene, bis amide, and fatty acid esters, e.g. butyl stearate, glyceryl stearate, linseed oil, palm oil, decyloleate, corn oil, cottonseed oil, hydrogenated cottonseed oil, etc.

The stabilizer compositions of this invention may be prepared by pre-blending the components thereof in any convenient manner which produces a homogeneous mixture, such as by shaking or stirring in a container. Likewise, the stabilized compositions of this invention can be incorporated in the halogen-containing organic polymer by admixing the stabilizer composition and polymer, such as, for example, in an appropriate mill or mixer or by any other of the well-known methods which provide uniform distribution of the stabilizer throughout the polymer.

The stabilizer compositions of this invention are employed in an amount sufficient to impart the desired resistance to heat deterioration to halogen-containing organic polymers. It will be readily apparent to one of ordinary skill in the art, that the precise amount of stabilizer composition used will depend upon several factors, including, but not limited to, the particular halogen-containing organic polymer employed, the temperature to which the polymer will be subjected, and the possible presence of other stabilizing compounds. In general, the more severe the conditions to which the halogen-containing organic polymer is subjected, and the longer the term required for resisting degradation, the greater will be the amount of stabilizer composition required. Generally, as little as about 0.4% by weight based on the weight of the halogen-containing organic polymer will be effective. While there is no critical upper limit to the amount of stabilizer composition which can be employed, amounts in excess of about 4% by weight based on the weight of halogen-containing polymer do not give an increase in effectiveness commensurate with the additional amount of stabilizer employed.

The following examples further illustrate the preparation of an exemplary latent mercaptan, the preparation of stabilizer compositions of this invention, and the advantages of said stabilizer compositions in clear halogen-containing polymer compositions.

Unless otherwise indicated, the stabilizer components and other auxiliary ingredients are specified in parts by weight per hundred parts of the halogen-containing resin ("phr").

EXAMPLE 1

Preparation of a Latent Mercaptan

2-S-tetrahydropyranyl) thioethyltallate was prepared by adding 172.45 grams (2.05 equiv.) of 3,4-dihydro(2H)pyran dropwise to 760.00 grams (2.00 equiv.) of 2-mercaptoethyltallate (8.70% SH by iodometric titration) containing 0.93 gram of methanesulfonic acid (70% active) over a period of 45 minutes under a nitrogen blanket and a temperature between 25–35° C. and heating to 35–40° C. for 2 hours. After cooling the solution, 3 grams of Norite carbon black was charged and the product was vacuum filtered to yield 932 grams of yellow liquid having a SH content of less than 0.4% as determined by titration with 0.100 N iodine solution in isopropanol. The $^1$H-NMR(CDCl3,δ) spectrum was: 2.3 (2H, t, —C(=O)—CH$_2$—CH$_2$—), 2.8 (2H, m, —S—CH$_2$—CH$_2$—), 4.3 (2H, m,(—CC(=O)—O—CH$_2$), 4.9 (1H, m, —O—CH(—S—CH$_2$)—CH$_2$—CH$_2$—). GC of the product (1% in ether) indicated one primary product peak at 26.3 minutes retention time (50–300° C.; 10° C./min.; split flow injector/FID).

EXAMPLES 2–5

Preparation of Rigid Clear PVC Compositions (Examples 2 and 3 are Comparative)

The following ingredients were blended together in the amounts given to provide four clear polyvinyl chloride compositions, the first two being stabilized with a latent mercaptan alone and the latter two being stabilized with a latent mercaptan in combination with a phenyl salicylate compound in accordance with this invention.

|  | Phr | | | |
| --- | --- | --- | --- | --- |
| Ingredients | Example 2 | Example 3 | Example 4 | Example 5 |
| PVC Resin (Occidental 190) | 100.0 | 100 | 100 | 100 |
| Impact Modifier (Kaneka B-22) | 6.0 | 6.0 | 6.0 | 6.0 |
| Process Aid (Rohm & Haas Acryloid K-120N) | 1.5 | 1.5 | 1.5 | 1.5 |
| Ester Wax Lubricant (Henkel Loxiol G-16) | 1.0 | 1.0 | 1.0 | 1.0 |
| Ester Wax Lubricant (Henkel Loxiol G-70) | 0.7 | 0.7 | 0.7 | 0.7 |
| Oxidized Polyethylene Lubricant (Allied AC-629A) | 0.2 | 0.2 | 0.2 | 0.2 |
| Epoxidized Soy Bean Oil Costabilizer | 1.0 | 1.0 | 1.0 | 1.0 |
| Organotin Mercaptide[1] | 2.5 | 2.0 | 2.5 | 2.0 |
| Latent Mercaptan (Example 1) | 0.5 | 1.0 | 0.5 | 1.0 |
| Phenyl Salicylate (Aldrich) | — | — | 0.25 | 0.25 |

Table Footnote
[1]The organotin mercaptide stabilizer is a mixture of 80 wt. % dimethyltin bis (2-ethylhexyl maleate) and 20 wt. % monomethyltin tris (2-ethylhexylmaleate).

Each resulting polymer composition was then formed into a plaque and tested for stability to light and weathering by exposing it to ultraviolet light (UV) and moisture in a Q-Panel QUV accelerated weathering tester equipped with a QUV-A-351 bulbs. Each plaque was weathered at 50° C. by exposing it to 10 hours of UV light followed by 2 hours of moisture condensation cycle. This was repeated until the plaque had been exposed for 960 hours. Samples were taken for evaluation every 160 hours. Color values were read using a Hunter calorimeter. Delta E (total color change) readings for each composition using the initial (0 hour) sample as a color reference, which are given in the Table below.

|  | Delta E | | | | | |
| --- | --- | --- | --- | --- | --- | --- |
| Hours | 160 | 320 | 480 | 640 | 800 | 960 |
| Example 2 | 18.95 | 17.39 | 24.01 | 25.89 | 28.06 | 30.13 |
| Example 3 | 18.50 | 19.07 | 28.86 | 23.49 | 24.89 | 31.03 |
| Example 4 | 9.56 | 9.11 | 14.80 | 14.62 | 18.62 | 20.34 |
| Example 5 | 10.52 | 11.00 | 15.25 | 17.45 | 20.15 | 19.02 |

The above results demonstrate: 1) that latent mercaptan systems alone are poor weathering stabilizers; and 2) the weathering stabilization of latent mercaptan systems is significantly improved by their use in combination with phenyl salicylate compounds in clear polyvinyl chloride compositions.

EXAMPLES 6–7

Preparation of Flexible Clear PVC Compositions (Example 6 is Comparative)

The following ingredients were blended together in the amounts given and tested for weathering according to the procedure set forth in Examples 2–5 with the exception that a 4 hour UV/4 hour condensation cycle was employed for 1600 hours.

|  | Phr | |
| --- | --- | --- |
| Ingredients | Example 6 | Example 7 |
| PVC Resin (Geon 30) | 100.0 | 100.0 |
| Diiaodeoyl Phthalate Plasticizer | 40.0 | 40.0 |
| Epoxidized Soybean Oil Costabilizer | 6.0 | 5.0 |
| Stearic Acid Lubricant | 0.2 | 0.2 |
| Oxidized Polyethylene Lubricant (Allied AC-629 A) | 0.2 | 0.2 |
| Latent Mercaptan (Example 1) | 2.0 | 2.0 |
| Zinc Octoate Stabilizer | 0.1 | 0.1 |
| Phenyl Salicylate | — | 0.1 |

|  | Delta E | | | | | | | | | |
| --- | --- | --- | --- | --- | --- | --- | --- | --- | --- | --- |
| Hours | 160 | 320 | 480 | 640 | 800 | 960 | 1120 | 1280 | 1440 | 1600 |
| Example 6 | 9.7 | 0.7 | 2.4 | 12.3 | 14.5 | 18.2 | 21.5 | 19.0 | 22.7 | 22.2 |
| Example 7 | 8.1 | 0.6 | 1.3 | 5.6 | 9.9 | 10.5 | 9.0 | 12.7 | 14.0 | 11.7 |

The above results demonstrate: 1) that latent mercaptan systems alone are poor weathering stabilizers; and 2) the weathering stabilization of latent mercaptan systems is significantly improved by their use in combination with phenyl salicylate compounds in clear polyvinyl chloride compositions.

EXAMPLES 8–9

Preparation of Flexible Pigmented PVC Compositions (Examples 8 and 9 are Comparative)

The following ingredients were blended together in the amounts given to provide two pigmented polyvinyl chloride compositions, the first being stabilized with a latent mercaptan system alone and the second being stabilized with a latent mercaptan system in combination with a phenyl salicylate compound.

|  | Delta E | | | | | | | | | |
|---|---|---|---|---|---|---|---|---|---|---|
| Hours | 160 | 320 | 480 | 640 | 800 | 960 | 1120 | 1280 | 1440 | 1600 |
| Example 6 | 9.7 | 0.7 | 2.4 | 12.3 | 14.5 | 18.2 | 21.5 | 19.0 | 22.7 | 22.2 |
| Example 7 | 8.1 | 0.6 | 1.3 | 5.6 | 9.9 | 10.5 | 9.0 | 12.7 | 14.0 | 11.7 |

Each resulting polymer composition was QUV weathering tested in accordance with the procedure outlined in the Examples 6–7. Delta E (total color change) readings for each composition using the initial (0 hour) sample as a color reference are given in the Table below.

|  | Delta E | | | | | | | | | |
|---|---|---|---|---|---|---|---|---|---|---|
| Hours | 160 | 320 | 480 | 640 | 800 | 960 | 1120 | 1280 | 1440 | 1600 |
| Example 8 | 0.4 | 0.8 | 2.1 | 0.9 | 1.5 | 1.5 | 1.0 | 1.7 | 2.4 | 3.0 |
| Example 9 | 0.5 | 0.4 | 1.3 | 0.8 | 0.6 | 1.7 | 1.3 | 1.3 | 1.4 | 3.6 |

The above results demonstrate: 1) that latent mercaptan stabilizer systems alone are poor weathering stabilizers; and 2) no benefit in terms of weathering stabilization is provided by their use in combination with phenyl salicylate compounds in pigmented polyvinyl chloride compositions, as the phenyl salicylate compounds are not functionally active therein.

Articles of manufacture contemplated by this invention, e.g. pipe, film, siding, window profile, window frames, corrugated roofing, door stripping, are formed from the stabilized polymer compositions of this invention by any of the well-known conventional techniques for forming polymers into shaped articles.

While a few specific embodiments of this invention have been disclosed in considerable detail, variations and modifications of these embodiments can be effected without departing from the spirit and scope of the invention as disclosed and claimed herein.

The subject matter claimed is:

1. A composition capable of stabilizing clear halogenated polymer compositions against the deteriorative effects of heat, light and weathering, comprising:

A) a latent mercaptan which degrades during processing of the composition at an elevated temperature to liberate a free mercautan; wherein the latent mercaptan has the formula:

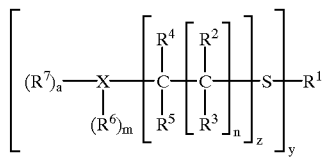

wherein a is 0 or 1; m and n are 0 or 1; y=1 to 4; when y=1, z is 1 to 4; and when is more than 1, z is 1; $R^1$ is a hydroxyalkyl, dihydroxyalkyl, hydroxy(polyalkoxy)alkyl, alkoxyalkyl, hydroxyalkoxyalkyl, alkoxy(hydroxyalkyl), alkoxy(acyloxyalkyl), alkoxy(polyalkoxy)alkyl, carboxyalkyl, acyloxyalkyl, acyloxy(hydroxyalkyl), acyloxyalkoxyalkyl, acyloxy(polyalkoxy)alkyl, benzoyloxy (polyalkoxy)alkyl, alkylenebis-(acyloxyalkyl), alkoxycarbonylalkyl, alkoxycarbonylalkylenyl, hydroxyalkoxycarbonylalkyl, hydroxy(polyalkoxy) carbonylalkyl, alkoxy(polyalkoxy)carbonylalkyl, mercaptoalkyl, mercaptoalkylenyl, mercaptoalkoxycarbonylalkyl, mercaptoalkoxycarbonylalkylenyl, alkoxycarbonyl(amido)alkyl, alkylcarbonyloxy(polyalkoxy) carbonylalkyl, tetrahydropyranyloxyalkyl, tetrahydopyranyloxy(polyalkoxy)carbonylalkyl, hydroxyaryl, mercaptoaryl or carboxyaryl radical having from 1 to 22 carbon atoms; $R^2$, $R^3$, $R^4$, $R^5$, $R^6$, and $R^7$ are independently hydrogen, a hydroxyl, mercapto, acyl, alkyl, alkylenyl, aryl, haloaryl, alkaryl, aralkyl, hydroxyalkyl, mercaptoalkyl, hydroxyaryl, alkoxyaryl, alkoxyhydroxyaryl, hydroxyalkyl, mercaptoalkyl, mercaptoalkylenyl, mercaptoalkoxycarbonylalkylenyl, hydroxyaryl, arylcarbonyl, mercaptoaryl, carboxyalkyl, carboxyaryl, or acyl radical having from 1 to 22 carbon atoms; X is aryl, haloaryl, alkaryl, hydroxyaryl, dihydroxyaryl, aralkaryl, alkoxyaryl, arylcycloalkyl, or a heteroatom, with the option that when a is 1 and m is 0, one of the $R^3$ and $R^5$ radicals joins with $R^7$ and X to form a heterocyclic moiety with X as a heteroatom selected from the group consisting of oxygen and sulfur, and with the further option that when m is 1, $R^6$ and $R^7$ form a heterocyclic moiety in conjunction with X as a nitrogen atom; with the proviso that when X is aralkaryl, $R^6$ and $R^7$ are hydroxyl, a is 1 and m is 1, then z is 1 or 2, and with the further proviso that when $R^6 \neq$ hydroxyl or mercapto, z is 1 and, B) a free phenyl salicylate compound.

2. The composition of claim 1, wherein said composition is incorporated in a stabiliziny effective amount into a clear halogen-containing polymer composition.

3. The composition of claim 1 characterized further by the presence of a heat stabilizer selected from the group consisting of metal-based heat stabilizers, Lewis Acids, organic-based heat stabilizers, and hydrotalcite-based heat stabilizers.

4. The composition of claim 3 wherein the heat stabilizer comprises at least one metal-based heat stabilizer selected from the group consisting of antimony-, barium-, magnesium-, and calcium-, tin-, and zinc-based stabilizers.

5. The composition of claim 4 wherein the metal-based stabilizer is a zinc soap.

6. The composition of claim 3 wherein the other heat stabilizer comprises at least one metal-based heat stabilizer selected from an organotin compound.

7. The composition of claim 6 wherein the organotin compound is selected from the group consisting of organotin mercaptides, mono- and poly-sulfides of organotin mercaptides, and organotin carboxylates.

8. The composition of claim 7 wherein the mercaptide moiety is an alkyl thioglycolate.

9. The composition of claim 7 wherein the mercaptide moiety is a mercaptoalkyl carboxylate.

10. A clear halogen-containing polymer composition stabilized against the deteriorative effects of heat, light and weathering, said composition being capable of producing substantially transparent articles, said composition comprising a halogenated polymer and, in an amount sufficient to stabilize said polymer against the deteriorative effects of heat, light and weathering, a stabilizer composition comprising the combination of:

A) degradation products of a blocked mercaptan present during processing of the composition at an elevated temperature, said products including a free mercaptan; wherein said latent mercptan has the structure

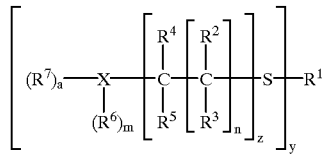

wherein a is 0 or 1, m and n are 0 or 1; y=1 to 4; when y=1, z is 1 to 4; and when y is more than 1, z is 1; $R^1$ is a hydroxyalkyl, dihydroxyalkyl, hydroxy(polyalkoxy)alkyl, alkoxyalkyl, hydroxyalkoxyalkyl, alkoxy(hydroxyalkyl), alkoxy(acyloxyalkyl), alkoxy(polyalkoxy)alkyl, carboxyalkyl, acyloxyalkyl, acyloxy(hydroxyalkyl), acyloxyalkoxyalkyl, acyloxy(polyalkoxy)alkyl, benzoyloxy (polyalkoxy)alkyl, alkylenebis-(acyloxyalkyl), alkoxycarbonylalkyl, alkoxycarbonylalkylenyl, hydroxyalkoxycarbonylalkyl, hydroxy(polyalkoxy) carbonylalkyl, alkoxy(polyalkoxy)carbonylalkyl, mercaptoalkyl, mercaptoalkylenyl, mercaptoalkoxycarbonylalkyl, mercaptoalkoxycarbonylalkylenyl, alkoxycarbonyl(amido)alkyl, alkylcarbonyloxy(polyalkoxy) carbonylalkyl, tetrahydropyranyloxyalkyl, tetrahydopyranyloxy(polyalkoxy)carbonylalkyl, hydroxyaryl, mercaptoaryl or carboxyatyl radical having from 1 to 22 carbon atoms; $R^2$, $R^3$, $R^4$, $R^5$, $R^6$, and $R^7$ are independently hydrogen, a hydroxyl, mercapto, acyl, alkyl, alkylenyl, aryl, haloaryl alkaryl, aralkyl, hydroxyalkyl, mercaptoalkyl, hydroxyaryl, alkoxyaryl, alkoxyhydroxyaryl, hydroxyalkyl, mercaptoalkyl, mercaptoalkylenyl, mercaptoalkoxycarbonylalkylenyl, hydroxyaryl, arylcarbonyl, mercaptoaryl, carboxyalkyl, carboxyaryl, or acyl radical having from 1 to 22 carbon atoms; X is aryl, haloaryl, alkaryl, hydroxyaryl, dihydroxyaryl, aralkaryl, alkoxyaryl, arylcycloalkyl, or a heteroatom, with the option that when a is 1 and m is 0, one of the $R^3$ and $R^5$ radicals joins with $R^7$ and X to form a heterocyclic moiety with X as a heteroatom selected from the group consisting of oxygen and sulfur, and with the further option that when m is 1, $R^6$ and $R^7$ form a heterocyclic moiety in conjunction with X as a nitrogen atom; with the proviso that when X is aralkaryl, $R^6$ and $R^7$ are hydroxyl, a is 1 and m is 1, then z is 1 or 2, and with the further proviso that when $R^6 \neq$ hydroxyl or mercapto, z is 1; and, B) in an amount sufficient to synergize the stabilization of the free mercaptan, a free phenyl salicylate compound.

11. The polymeric composition of claim 10 wherein said free phenyl salicylate has the formula:

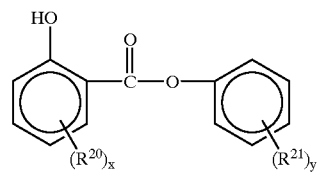

where
$R^{20}$ and $R^{21}$ are at each independent occurrence selected from hydrogen, an alkyl, phenyl, alkoxy, phenoxy, alkylcarboxy, hydroxyl, halogen, carboxyl, benzoyl, glycidyl, glycidylamino, alkylamino, amido, hydroxypolyalkoxy, alkoxypolyalkoxy, or acyloxypolyalkoxy radical; and, x is any integer from 1 to 4 and y is any integer from 1 to 5.

12. The composition of claim 10 which contains from about 0.4 to about 4 wt % of said stabilizer composition relative to the weight of the halogen-containing polymer.

13. The composition of claim 10 characterized further by the presence of a heat stabilizer selected from the group consisting of metal-based heat stabilizers, Lewis Acids, organic-based heat stabilizers, and hydrotalcite-based heat stabilizers.

14. The composition of claim 1, which contains from about 50 wt % to about 98.8 wt %, based on the combined weight of A) plus B), of said latent mercaptan, and from about 1.2 wt % to about 50 wt. %, based on the combined weight of A) plus B), of said free phenyl salicylate compound.

15. The composition of claim 1, wherein said free phenyl salicylate has the formula:

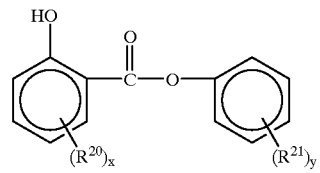

wherein
$R^{20}$ and $R^{21}$ are at each independent occurrence selected from hydrogen, an alkyl, phenyl, alkoxy, phenoxy, alkylcarboxy, hydroxyl, halogen, carboxyl, benzoyl, glycidyl, glycidylamino, alkylamino, amido, hydroxypolyalkoxy, alkoxypolyalkoxy, or acyloxypolyalkoxy radical; and, x is any integer from 1 to 4, and y is any integer from 1 to 5.

* * * * *